June 29, 1965 L. REDMAYNE 3,191,722
SHOE DRUM BRAKES
Filed June 29, 1962 8 Sheets-Sheet 1

Inventor
Leonard Redmayne
By: Scrivener and Parker
Attorneys

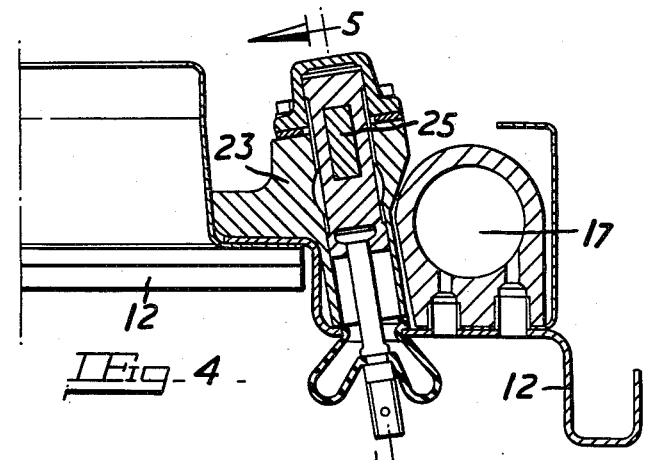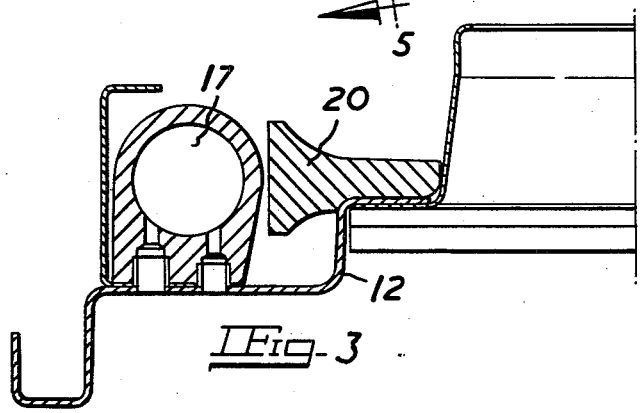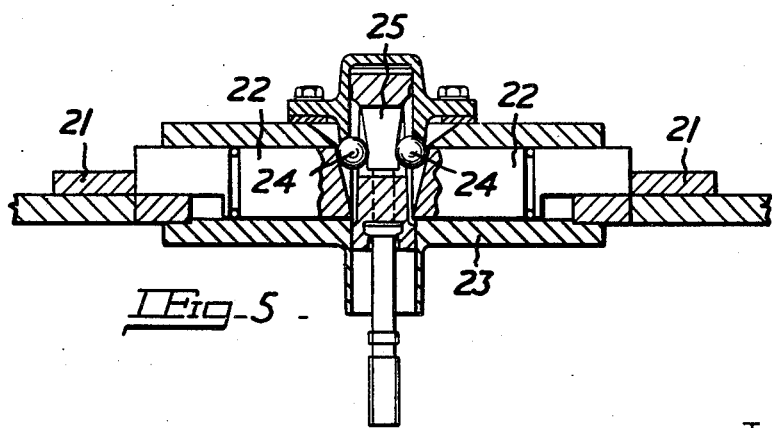

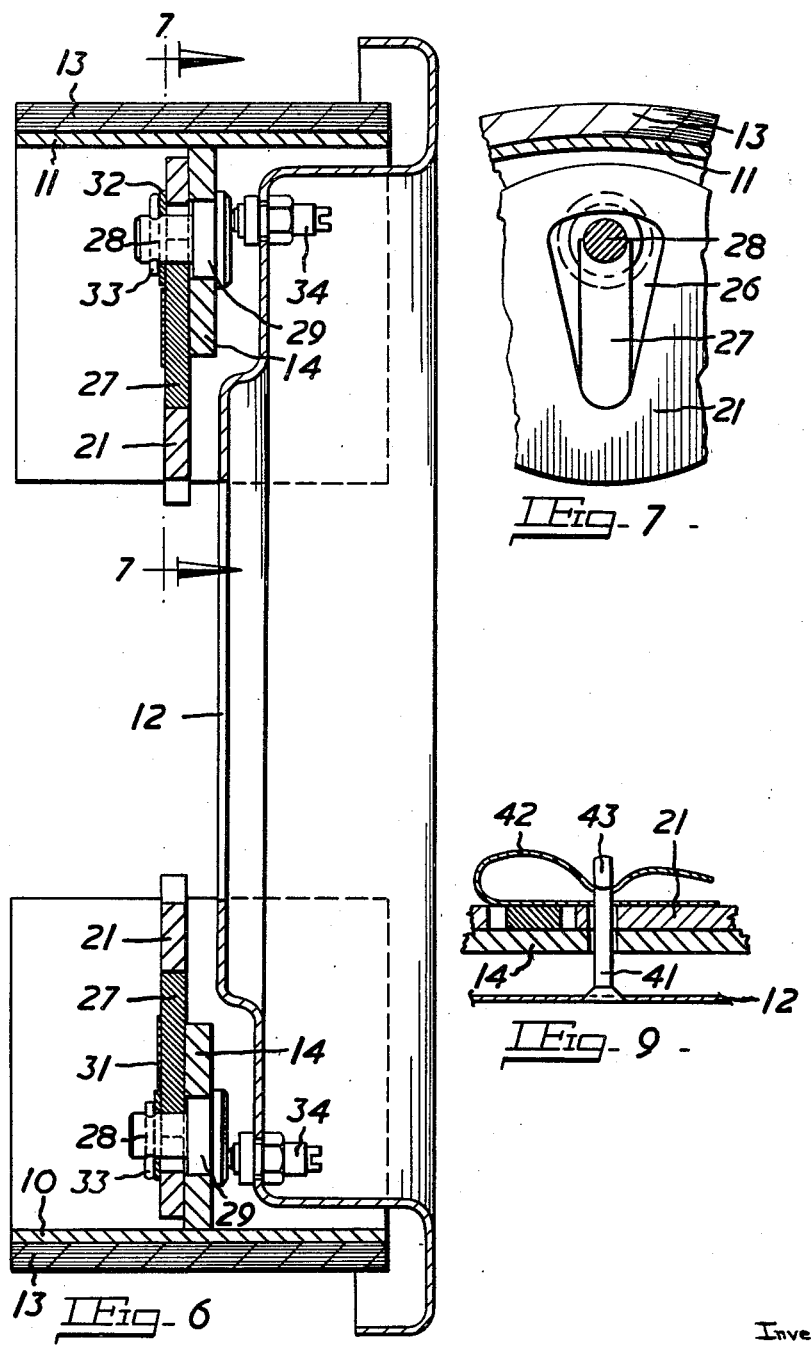

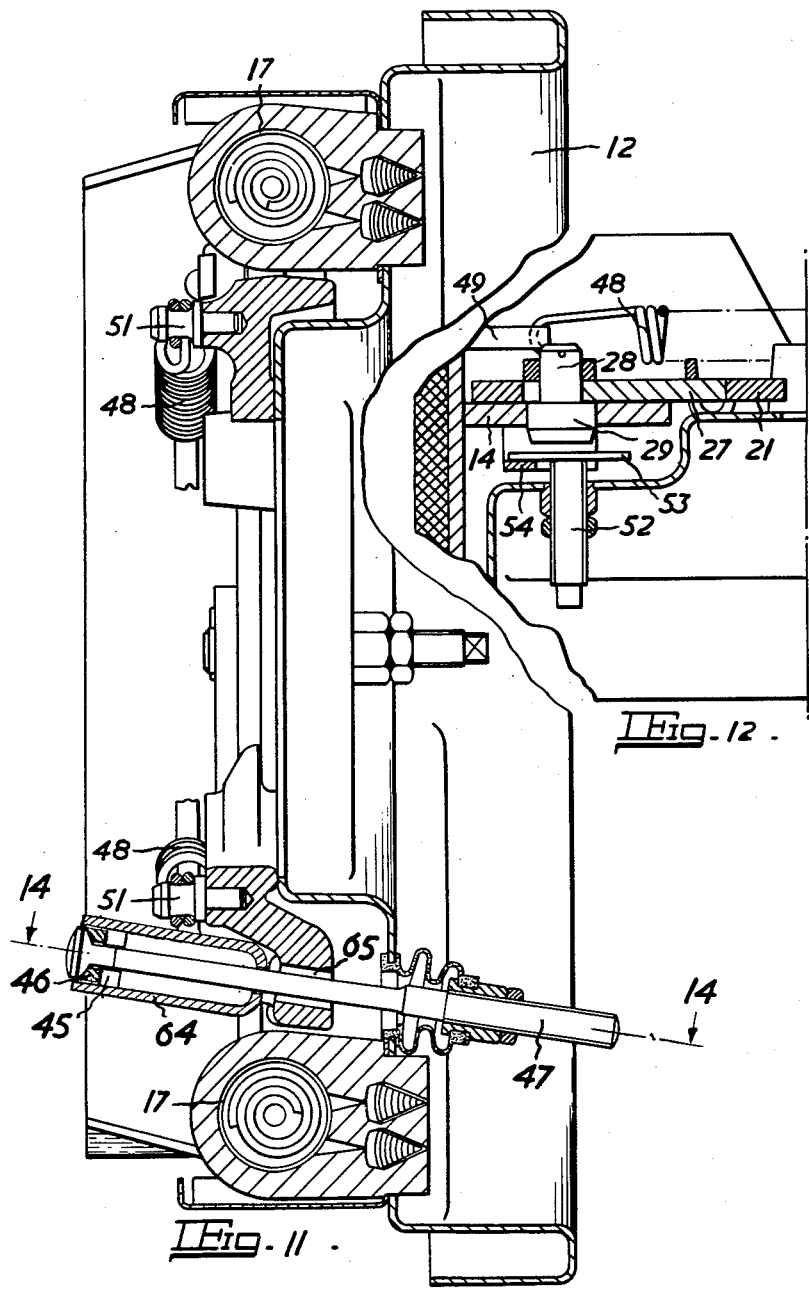

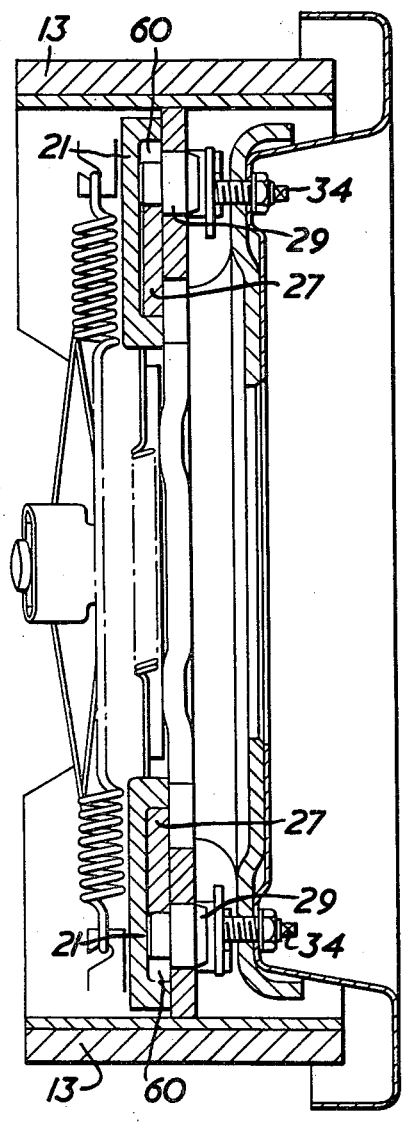

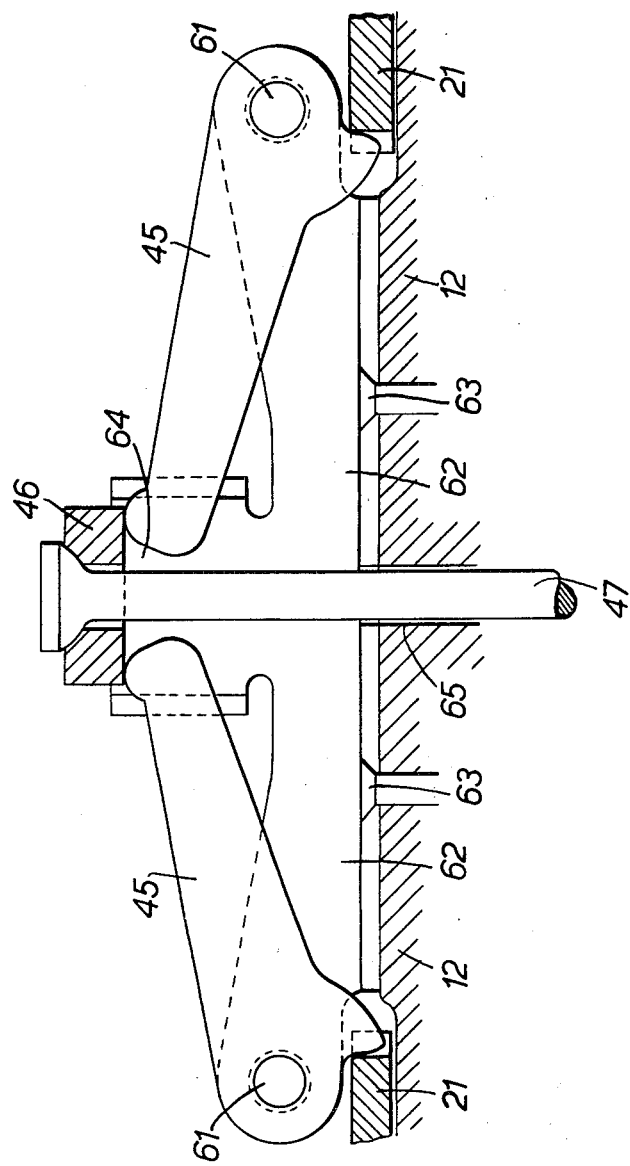

United States Patent Office 3,191,722
Patented June 29, 1965

3,191,722
SHOE DRUM BRAKES
Leonard Redmayne, Solihull, England, assignor to Girling Limited, Tyseley, England, a British company
Filed June 29, 1962, Ser. No. 207,173
Claims priority, application Great Britain, July 1, 1961, 23,857/61
11 Claims. (Cl. 188—78)

This invention relates to improvements in shoe drum brakes of the kind in which arcuate shoes carrying friction linings co-operate with a rotatable drum, the shoes being urged into engagement with the drum by mechanical or hydraulic means, or both mechanical and hydraulic means.

According to one feature of our invention, in a brake of that kind at least one of the shoes is actuated by means of a carrier or lever which is located on one side of the shoe web and which carries a strut operating between the carrier or lever and the shoe web.

According to another feature of our invention, in a brake of that kind, at least one of the shoes is movable into engagement with the brake drum by two separate actuating means of which one acts directly on the shoe end, and the other acts on a carrier or lever which engages the shoe at an intermediate point in its length.

According to a further feature of our invention, in a brake of the kind in which the shoes have a limited circumferential movement and are adapted to anchor about either end according to the direction of rotation of the drum, so that both shoes act as leading shoes in both directions, the shoes are separated to apply the brake by hydraulic actuating means acting directly on the shoe webs and by mechanical actuating means acting on carriers or levers which lie on one side of the shoe webs and engage the shoes at intermediate points in their lengths.

In either form, the carrier or lever conveniently acts on the shoe through a substantially radial thrust member or strut which is located between abutments on the lever and shoe, and lies in or closely adjacent to the neutral axis of the lever.

A recess may be pressed or otherwise formed in the lever to house the thrust member or strut or an opening may be pierced in the lever.

The lever may be formed by a flat plate lying alongside the web of the shoe, one end of the lever being adapted to fulcrum on a fixed or adjustable abutment while the other end is engaged by the actuator.

The thrust member or strut is preferably located at or about the middle of the lengths of the lever and shoe, and abuts between the inner end of the recess or opening in the lever and a pin or other projection on the shoe web and extending into the recess or through the opening in the lever.

Figure 1:
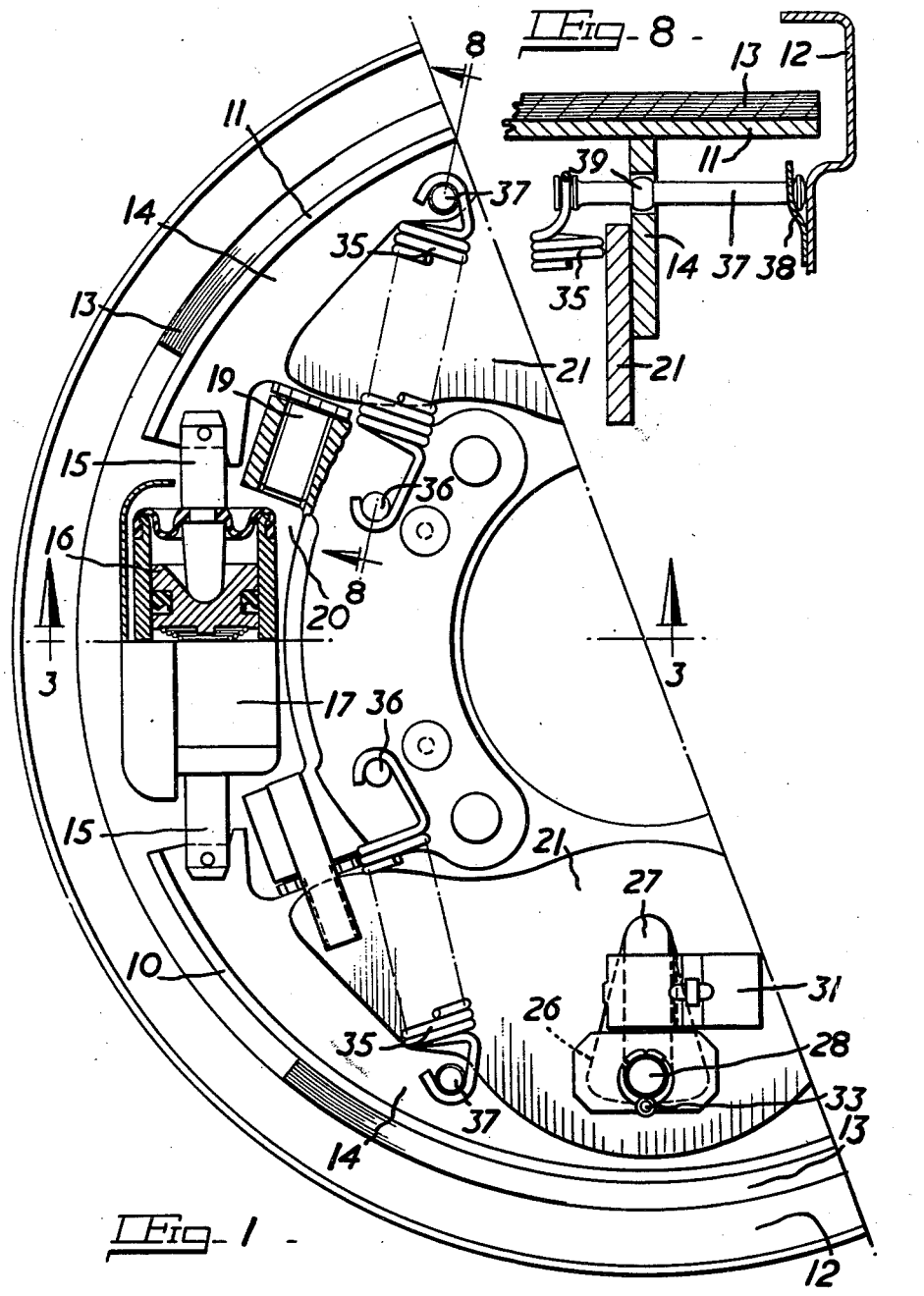
Figure 2:
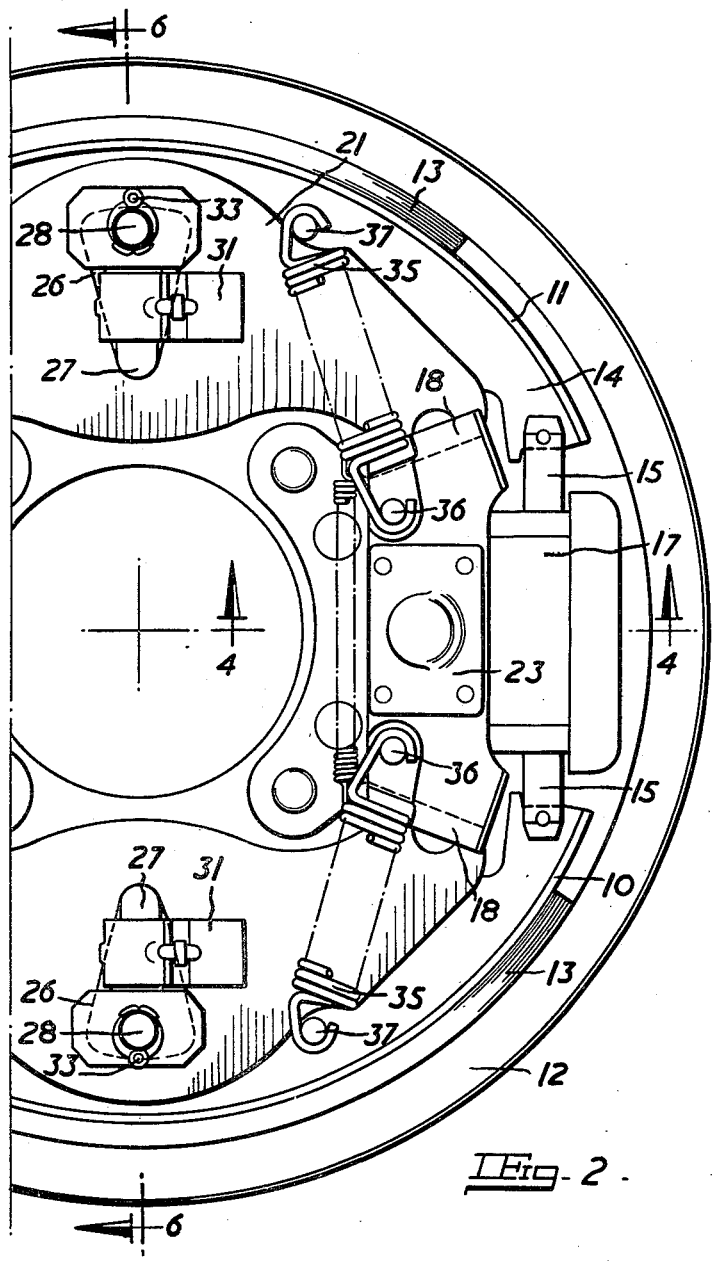
Figure 10:
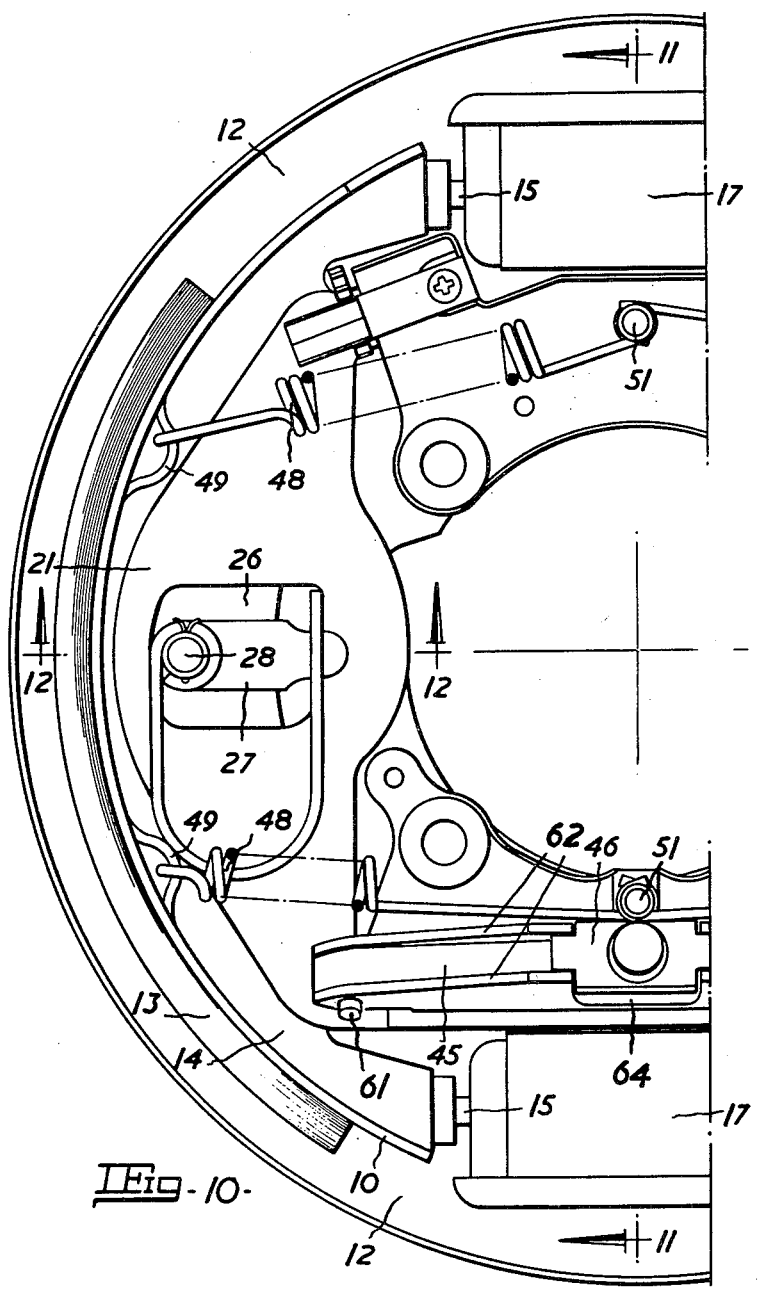

Two brakes embodying our invention are illustrated by way of example in the accompanying drawings, in which:

FIGURE 1 is an end elevation of one form of brake showing one half of the mechanism;
FIGURE 2 is a similar view showing the other half;
FIGURE 3 is a fragmentary section on the line 3—3 of FIGURE 1;
FIGURE 4 is a fragmentary section on the line 4—4 of FIGURE 2;
FIGURE 5 is a section on the line 5—5 of FIGURE 4;
FIGURE 6 is a section of the brake on the line 6—6 of FIGURE 2;
FIGURE 7 is a fragmentary section on the line 7—7 of FIGURE 6;
FIGURE 8 is a fragmentary section on the line 8—8 of FIGURE 1;
FIGURE 9 is a fragmentary section of an alternative means for locating the brake shoes;
FIGURE 10 is an end elevation of a modified form of brake;
FIGURE 11 is a section on the line 11—11 of FIGURE 10;
FIGURE 12 is a fragmentary section on the line 12—12 of FIGURE 10;
FIGURE 13 is a section similar to FIGURE 6 but showing the struts located in recesses; and
FIGURE 14 is a section on the line 14—14 of FIGURE 11.

In the brake illustrated in FIGURES 1 to 8, 10, 11 are opposed arcuate brake shoes mounted on a stationary back-plate or torque plate 12 and carrying friction linings 13 adapted to engage with a rotatable brake drum (not shown). Each shoe is of T section with a radial web 14. At the ends of the shoes, the webs are received in notches in the outer ends of opposed tappets 15 of which the inner ends are in rocking engagement with recesses in opposed pistons 16 in double-ended wheel cylinders 17, as shown in section on the left side of FIGURE 1.

The wheel cylinders are bolted or otherwise secured to the back-plate, and when fluid under pressure is forced into the cylinders from a pedal-operated master cylinder, or other source of fluid under pressure, the tappets 15 are urged apart to move the shoes outwardly into engagement with the drum.

The shoes are free to move circumferentially through a limited distance and to fulcrum on stationary anchorages at either end according to the direction of rotation of the drum, so that both shoes act as leading shoes in both directions of rotation. The shoes fulcrum at one end on fixed abutment members 18 (FIGURE 2) and at the other end on tappets 19 adjustably screwed into a fixed member 20.

The shoes are also actuated mechanically through arcuate carriers or levers 21 located at one side of the shoe webs. Each carrier or lever fulcrums at one end on one of the adjustable tappets 19, and the other ends of the carriers or levers are adapted to be separated by opposed aligned tappets 22 slidably mounted in a housing 23 integral with the abutment members 18. The inner ends of the tappets are oppositely inclined, and balls or rollers 24 are interposed between them and a wedge 25 which is movable in a direction substantially at right angles to the back-plate and is actuated by a pull-rod or cable. This is a known form of mechanical actuator.

A sector-shaped radial opening 26 in each carrier or lever at the middle of its length houses a radially disposed strut or thrust member 27 of which the inner end is rounded and is in rocking engagement with the rounded inner end of the opening. The outer end of the thrust member has formed in it a part-circular notch engaging a reduced spigot portion 28 of a pin 29 fixed in the shoe web at the centre of the length of the shoe. The thrust member is retained in the opening by a detachable cover plate 31 secured to the carrier or lever and is retained in engagement with the pin 29 by a washer 32 and split-pin 33. The head of the pin is engaged by a peg 34 adjustably mounted in the back-plate for locating the shoe relative to the back-plate as shown more particularly in FIGURE 6.

The ends of the shoes and of the carriers or levers are normally held in engagement with the stationary abutments by tension springs 35. Each spring is connected at one end to a peg 36 on a fixed part adjacent to an abutment and at the other end is connected to the free end of a rod 37. The other end of the rod is mounted to rock in an anchorage 38 on the back-plate, and at an intermediate point in its length the rod has a spherical enlargement 39 which is engaged in a clearance opening in the shoe web, as shown more particularly in FIGURE 8.

In the alternative method of locating a shoe shown in FIGURE 9, a pin 41 fixed in the back-plate passes through clearance openings in the shoe web and carrier or lever, and a flattened C-spring 42 is located between a head 43 on the pin and the carrier or lever.

In the embodiment illustrated, the strut or thrust member 27 is located in an opening 26 pierced in the carrier or lever.

As illustrated in FIGURE 13, the struts or thrust member 27 can be located in a recess 60 in the carrier or lever 21 and in this case the carrier or lever is formed as a sheet metal pressing.

In the modified form of brake shown in FIGURES 10, 11, 12 and 14, the arrangement of the shoes and of the means for actuating them hydraulically is substantially the same as that described above, and the same reference numerals have been applied to corresponding parts. In this brake, however, the shoes are also actuated mechanically through arcuate carriers or levers 21 which are adapted to be separated by bell crank levers 45 pivotally mounted at the outer ends on pins 61 located between plates 62 attached to the back-plate by bolts 63. Each plate is provided with an integral portion 64 of channel section, the channel section portions co-operating to form a guide for the bell cranks and a coupling member 46 adapted to engage the inner ends of the bell cranks. The coupling member is adapted to be moved in a direction substantially at right angles to the back-plate by a pull rod 47 working in a guide 65 in the backing plate for separating the carriers or levers to apply the shoes to the drum.

The pull-off springs 48 are connected between anchorage loops 49 on the shoes and fixed anchorage pegs 51 on the back-plate, and each shoe is located relative to the back-plate by a bolt 52 adjustably mounted in the back-plate and having a head 53 engaging in a slotted guide 54 fixed to the shoe web.

I claim:

1. A shoe drum brake comprising a rotatable drum, arcuate shoes carrying friction linings for co-operation with said rotatable drum, each shoe having a radial web, a carrier located on one side of each shoe web, a strut housed within a recess in each carrier and abutting between the inner end of the recess and a projection on the shoe web on which said carrier is located, said projection extending into said recess through an opening in said carrier, and two separate actuating means for urging said shoes into engagement with said drum of which one of said actuating means acts directly on said shoes and the other actuating means acts on said carrier.

2. A shoe drum brake comprising a rotatable drum, arcuate shoes carrying friction linings for co-operation with said rotatable drum, each shoe having a radial web, a carrier located on one side of each shoe web, a strut housed in an opening in each carrier and abutting between the inner end of said opening and a projection on the shoe web on which the carrier is located, said projection extending into said opening in said carrier, and two separate actuating means for urging said shoes into engagement with said drum of which one of said actuating means acts directly on said shoes and the other actuating means acts on said carriers.

3. A shoe drum brake comprising a rotatable drum, arcuate shoes carrying friction linings for co-operation with said drum, each shoe having a radial web, a carrier located on one side of each shoe web, thrust members engaging at one end with said carriers and at the other end with said shoes at intermediate points in their lengths, first and second actuating means for urging said shoes into engagement with said drum of which said first actuating means acts directly on said shoes and said second actuating means acts on said carrier, in which the shoes anchor at one end on a stationary abutment and at their other ends the shoes and the carriers anchor on common adjustable abutments and said shoes are adapted to fulcrum about either of said abutments according to the direction of rotation of the drum.

4. A shoe drum brake comprising a rotatable drum, arcuate shoes carrying friction linings for co-operation with said drum, each shoe having opposite ends, at least one shoe having a carrier located in a plane offset to one side of its central plane, said carrier having an actuated end and a non-actuated end, first and second actuating means operable independently to urge said shoes into engagement with said drum of which said first actuating means acts directly on said shoes and said second actuating means act on said actuated end of said carrier, abutment means about which either end of each shoe is adapted to fulcrum when said shoes are urged into engagement with said drum by said first actuating means and about which either end of said shoes and said non-actuated end of said carrier are adapted to fulcrum when said shoes are urged into engagement with said drum by said second actuating means whereby said shoe on which said carrier is located is permitted a limited circumferential movement relative to said carrier in the application of the brake.

5. A shoe drum brake comprising a rotatable drum, arcuate shoes carrying friction linings for co-operation with said drum, each shoe having a first end and a second end, a carrier located in a plane offset to one side of the central plane of each shoe and having an actuated end and a non-actuated end, first and second actuating means operable separately and independently to urge said shoes into engagement with said drum of which said first actuating means acts directly on said shoes and said second actuating means acts on said actuated ends of said carriers, first and second abutment means about which either end of each shoe is adapted to fulcrum when said shoes are urged into engagement with said drum by said first actuating means and about which said end of each shoe and said non-actuated ends of said carrier are adapted to fulcrum when said shoes are urged into engagement with said drum by said second actuating means, whereby each shoe is permitted a limited circumferential movement relative to each carrier in the application of the brake.

6. A shoe drum brake as claimed in claim 5, wherein each shoe has a single web disposed in the central plane of the shoe, and said carrier is disposed on one side of said shoe web.

7. A shoe drum brake comprising a rotatable drum, arcuate shoes carrying friction linings for co-operation with said drum, each shoe having opposite ends, at least one shoe having a carrier located in a plane offset to one side of its central plane, said carrier having an actuated end and a non-actuated end, actuating means acting on said actuated end of said carrier to urge at least said one shoe into engagement with said drum, first abutment means about which said non-actuated end of said carrier and one end of at least said one shoe are adapted to fulcrum when at least said one shoe is urged into engagement with said drum by said actuating means and the drum is rotating in one direction, and second abutment means about which the opposite end of said one shoe is adapted to fulcrum when it is urged into engagement with said drum and said drum is rotating in the opposite direction, whereby said one shoe is permitted a limited circumferential movement relative to said carrier in the application of the brake.

8. A shoe drum brake comprising a rotatable drum, arcuate shoes carrying friction linings for co-operation with said drum, each shoe having a first end and a second end, a carrier located in a plane offset to one side of the central plane of each shoe and having an actuated end and a non-actuated end, actuating means acting on said actuated ends of said carriers to urge said shoes into engagement with said drum, first abutment means about which said non-actuated end of each carrier and either end of each shoe are adapted to fulcrum when said shoes are urged into engagement with said drum with the drum rotating in one direction, and second abutment means about which the other end of each shoe is adapted to fulcrum when said drum is rotating in the opposite direction, whereby each shoe is permitted a limited circumferential movement relative to its carrier in the application of the brake.

9. A shoe drum brake comprising a rotatable drum, arcuate shoes carrying friction linings for co-operation with said rotatable drum, each shoe having a radial web and opposite ends, a carrier located on one side of each shoe web, each carrier having an actuated end and a non-actuated end, radial thrust members engaging at one end with said carriers and at the other end with said shoes at intermediate points in their lengths, first and second actuating means operable independently to urge said shoes into engagement with said drum of which said first actuating means acts directly on the shoes and said second actuating means acts on said actuated end of the carriers, and abutment means about which either end of each shoe is adapted to fulcrum when the shoes are urged into engagement with said drum by said first actuating means, and about which either end of said shoes and said non-actuated end of said carriers are adapted to fulcrum when said shoes are urged into engagement with said drum by said second actuating means.

10. A shoe drum brake comprising a rotatable drum, arcuate shoes carrying friction linings for co-operation with said drum, at least one shoe having a radial web and opposite ends, a carrier located on one side of said web and adapted to engage said shoe in an intermediate point in its length, said carrier having an actuated end and a non-actuated end, first and second actuating means operable independently to urge at least said one shoe into engagement with said drum of which said first actuating means acts directly on the shoe and the second actuating means acts on said actuated end of said carrier, and abutment means about which either end of said one shoe is adapted to fulcrum when the shoe is urged into engagement with said drum by said first actuating means, and about which either end of said one shoe and the non-actuated end of the carrier are adapted to fulcrum when the shoe is urged into engagement with the drum by said second actuating means.

11. A shoe drum brake comprising a rotatable drum, arcuate shoes carrying friction linings for co-operation with said rotatable drum, each shoe having a radial web and opposite ends, a carrier located on one side of each shoe web, each carrier having an actuated end and a non-actuated end, radial thrust members in articulated engagement at one end with said carriers and at the other end with said shoes at intermediate points in their lengths, first and second actuating means operable independently to urge said shoes into engagement with said drum of which said first actuating means acts directly on the shoes and said second actuating means acts on said actuated end of the carrier, and abutment means about which either end of each shoe is adapted to fulcrum when the shoes are urged into engagement with said drum by said first actuating means, and about which either end of said shoes and said non-actuated end of said carriers are adapted to fulcrum when said shoes are urged into engagement with said drum by said second actuating means.

References Cited by the Examiner

UNITED STATES PATENTS

| 2,389,311 | 11/45 | Hirschman et al. | 188—78 |
| 2,569,012 | 9/51 | Lauer | 188—78 |
| 2,822,065 | 2/58 | Goepfrich et al. | 188—78 |
| 2,841,251 | 7/58 | Shelton | 188—106 |
| 2,981,378 | 4/61 | Brisson | 188—78 |
| 3,061,051 | 10/62 | Swift | 188—78 |

FOREIGN PATENTS 799,109  3/36  France.

ARTHUR L. LA POINT, *Primary Examiner.*

A. JOSEPH GOLDBERG, RALPH D. BLAKESLEE, EUGENE G. BOTZ, *Examiners.*